(12) United States Patent
Lawrence et al.

(10) Patent No.: US 8,046,983 B2
(45) Date of Patent: Nov. 1, 2011

(54) ECOLOGY VALVE FUEL RETURN SYSTEM FOR GAS TURBINE ENGINE

(75) Inventors: David Lawrence, South Bend, IN (US); Paul Futa, North Liberty, IN (US)

(73) Assignee: Honeywell International Inc., Morristown, NJ (US)

(*) Notice: Subject to any disclaimer, the term of this patent is extended or adjusted under 35 U.S.C. 154(b) by 472 days.

(21) Appl. No.: 12/265,468

(22) Filed: Nov. 5, 2008

(65) Prior Publication Data

US 2010/0058733 A1 Mar. 11, 2010

Related U.S. Application Data

(60) Provisional application No. 61/096,109, filed on Sep. 11, 2008.

(51) Int. Cl.
*F02G 3/00* (2006.01)
(52) U.S. Cl. .......... 60/39.094; 60/734
(58) Field of Classification Search .......... 60/39.094, 60/39.281, 734, 739
See application file for complete search history.

(56) References Cited

U.S. PATENT DOCUMENTS

| | | | |
|---|---|---|---|
| 2,846,845 A * | 8/1958 | Parker | 60/39.094 |
| 3,991,561 A * | 11/1976 | Leto | 60/39.463 |
| 5,809,771 A | 9/1998 | Wernberg | |
| 6,195,978 B1 * | 3/2001 | Futa, Jr. | 60/39.094 |
| 6,484,510 B2 | 11/2002 | Futa, Jr. et al. | |
| 6,536,217 B2 | 3/2003 | Lipinski et al. | |
| 6,619,025 B2 | 9/2003 | Wernberg | |
| 6,751,939 B2 | 6/2004 | Futa, Jr. et al. | |
| 6,892,544 B2 | 5/2005 | Futa, Jr. et al. | |
| 6,941,754 B2 | 9/2005 | Aldridge et al. | |
| 7,093,420 B2 | 8/2006 | Futa, Jr. et al. | |
| 7,131,274 B2 * | 11/2006 | Baryshnikov et al. | 60/772 |
| 7,200,985 B2 * | 4/2007 | Tuttle et al. | 60/39.094 |
| 2002/0073687 A1 | 6/2002 | Lipinski et al. | |
| 2002/0095936 A1 * | 7/2002 | Futa et al. | 60/772 |
| 2003/0110775 A1 | 6/2003 | Wernberg | |
| 2003/0200754 A1 | 10/2003 | Futa, Jr. et al. | |
| 2005/0166572 A1 | 8/2005 | Futa, Jr. et al. | |
| 2007/0245744 A1 | 10/2007 | Dooley | |
| 2009/0211558 A1 * | 8/2009 | Anson et al. | 123/497 |
| 2010/0031658 A1 * | 2/2010 | Falke et al. | 60/734 |
| 2010/0037612 A1 * | 2/2010 | Futa et al. | 60/734 |

* cited by examiner

*Primary Examiner* — Louis Casaregola
*Assistant Examiner* — Phutthiwat Wongwian
(74) *Attorney, Agent, or Firm* — Ingrassia Fisher & Lorenz, P.C.

(57) ABSTRACT

An ecology valve (EV) fuel return system is provided. In one embodiment, the EV fuel return system includes a housing assembly having a fuel return outlet and a first manifold inlet. The fuel return outlet is fluidly coupled to a fuel supply system, and the first manifold inlet is fluidly coupled to a first manifold of a gas turbine engine (GTE). An ecology valve is disposed in the housing assembly and fluidly coupled to the fuel return outlet and to the first manifold inlet. A fuel routing assembly is fluidly coupled between the first manifold inlet, the fuel return outlet, and the ecology valve. The fuel routing assembly routes fuel: (i) from the first manifold inlet to the ecology valve when the GTE is in a shut-down mode, and (ii) from the ecology valve to the fuel return outlet when the GTE is in an engine start mode.

20 Claims, 6 Drawing Sheets

ECOLOGY VALVE FUEL RETURN SYSTEM FOR GAS TURBINE ENGINE

CROSS-REFERENCES TO RELATED APPLICATIONS

This application claims the benefit of U.S. Provisional Application Ser. No. 61/096,109, filed Sep. 11, 2008.

TECHNICAL FIELD

The present invention relates generally to aircraft fuel control systems and, more particularly, to an ecology valve fuel return system suitable for use in conjunction a gas turbine engine of the type commonly deployed on an aircraft.

BACKGROUND

Auxiliary power units (APUs) are commonly deployed on aircraft to provide an efficient source of electrical power, pressurized air, and/or hydraulic pressure. Among other components, an APU may include a gas turbine engine (GTE) having one or more fuel manifolds disposed within a combustion chamber. During operation of the APU, a fuel supply system supplies metered fuel to the fuel manifolds. The manifolds include a series of nozzles (e.g., air blast nozzles and/or atomizer nozzles) that spray the burn fuel into the APU's combustion chamber. The resulting air-fuel mixture is then ignited to drive the rotation of one or more air turbines downstream of the combustion chamber. When including a GTE having multiple fuel manifolds (e.g., a primary manifold and a secondary manifold), the APU may be further equipped with a fuel divider system fluidly coupled between the fuel supply system and the GTE's manifolds. The fuel divider system apportions fuel between the primary and secondary manifold in accordance with a predetermined flow schedule (e.g., "quick fill logic") to optimize GTE operation; e.g., to achieve optimal engine lightoff conditions in a timely manner.

Due, at least in part, to recent regulations, it is now common for a GTE to be further equipped with an ecology valve (EV) fuel return system fluidly coupled to the GTE's fuel manifold or manifolds. The EV fuel return system is configured to remove a predetermined volume of burn fuel from the fuel manifolds upon cessation of GTE operation. Certain known piston/reservoir EV fuel return systems are further configured such that the withdrawn burn fuel is returned directly to the fuel manifolds for immediate combustion when GTE operation is again initiated (i.e., during engine start-up). Advantageously, by removing a predetermined volume of burn fuel from the fuel manifolds upon GTE shutdown, such piston/reservoir EV fuel return systems decrease the volume of fuel available for vaporization to the atmosphere and deter coking of the manifold nozzles. However, by returning this withdrawn burn fuel directly to the fuel manifold when GTE operation is again initiated, such piston/reservoir EV fuel return systems may disrupt the GTE's predetermined flow schedule and thereby comprise ideal engine lightoff conditions.

Considering the above, it is desirable to provide an ecology valve fuel return system that avoids disruption of a predetermined flow schedule when returning fuel previously withdrawn from one or more fuel manifolds upon, or shortly after, GTE startup. It is also desirable to provide a fuel control assembly employing such an ecology valve fuel return system. Other desirable features and characteristics of the present invention will become apparent from the subsequent Detailed Description and the appended claims, taken in conjunction with the accompanying drawings and this Background.

BRIEF SUMMARY

An ecology valve (EV) fuel return system is provided. In one embodiment, the EV fuel return system includes a housing assembly having a fuel return outlet and a first manifold inlet. The fuel return outlet is fluidly coupled to a fuel supply system, and the first manifold inlet is fluidly coupled to a first manifold of a gas turbine engine (GTE). An ecology valve is disposed in the housing assembly and fluidly coupled to the fuel return outlet and to the first manifold inlet. A fuel routing assembly is fluidly coupled between the first manifold inlet, the fuel return outlet, and the ecology valve. The fuel routing assembly is configured to route fuel: (i) from the first manifold inlet to the ecology valve when the GTE is in a shut-down mode, and (ii) from the ecology valve to the fuel return outlet when the GTE is in an engine start mode.

A fuel control assembly for use in conjunction with a gas turbine engine (GTE) including at least a first fuel manifold is further provided. In one embodiment, the fuel control assembly includes an ecology valve (EV) fuel return system and a fuel supply system. The fuel supply system is configured to be fluidly coupled to the first fuel manifold and to supply metered fuel thereto. The EV fuel return system includes a housing assembly, an ecology valve, and a fuel routing assembly. The fuel assembly has a fuel return outlet, which is fluidly coupled to the fuel supply system, and a fuel return inlet, which is configured to be fluidly coupled to the first fuel manifold. The ecology valve is disposed in the housing assembly and fluidly coupled between the fuel return outlet and the first manifold inlet. The fuel routing assembly fluidly coupled between the fuel return outlet, the first manifold inlet, and the ecology valve. The fuel routing assembly is configured to route fuel: (i) from the first manifold inlet to the ecology valve to withdraw fuel from the first fuel manifold when the GTE is in a shut-down mode, and (ii) from the ecology valve to the fuel return outlet to return fuel to the fuel supply system when the GTE is in an engine start mode.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
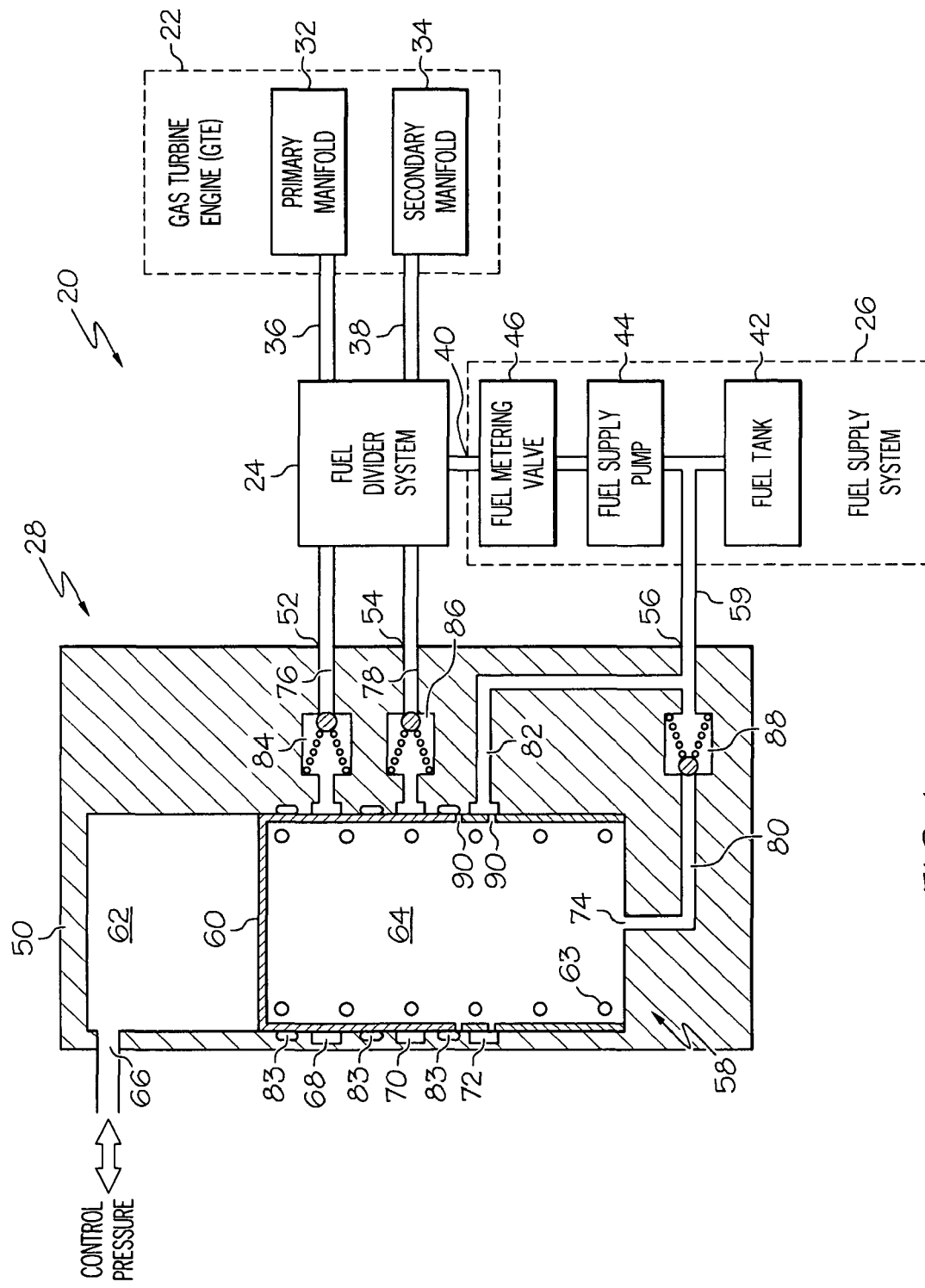
FIGS. 1-4 are simplified schematics of a fuel control assembly including an ecology valve fuel return system during various stages of operation in accordance with a first exemplary embodiment.

The following Detailed Description is merely exemplary in nature and is not intended to limit the invention or the application and uses of the invention. Furthermore, there is no intention to be bound by any theory presented in the preceding Background or the following Detailed Description.

FIGS. 1-4 are simplified block diagrams of an exemplary fuel control assembly 20 suitable for use in conjunction with a gas turbine engine (GTE) 22 of the type commonly deployed on an aircraft. GTE 22 may be utilized as, for example, a jet engine to provide propulsion to a host aircraft. Alternatively, GTE 22 may be included within an auxiliary power unit (APU) utilized to provide electrical power, pressurized air, and/or hydraulic pressure to various systems aboard the aircraft. For purposes of explanation, fuel control assembly 20 is shown in FIGS. 1-4 as including three main sub-systems: (i) a fuel divider system 24, (ii) a fuel supply system 26, and (iii) an ecology valve (EV) fuel return system 28. Although illustrated as a distinct entity in FIGS. 1-4, EV fuel return system 28 may be integrated with (e.g., incorporated into the same housing as) fuel divider system 24 and/or fuel supply system 26 in actual implementations of fuel control assembly 20.

GTE 22 may include any suitable number of fuel manifolds. In the illustrated example, GTE 22 includes a primary manifold 32 and a secondary manifold 34. Manifolds 32 and 34 are fluidly coupled to fuel divider system 24 via first and second flow passages 36 and 38, respectively. Fuel divider system 24 is, in turn, fluidly coupled to fuel supply system 26 via a third flow passage 40. During operation of GTE 22, fuel supply system 26 supplies metered fuel to fuel divider system 24, which then apportions the metered fuel between primary manifold 32 and secondary manifold 34 in accordance with a predetermined flow schedule. As indicated in FIG. 1-4, fuel supply system 26 may include a fuel tank 42, a fuel supply pump 44, and a fuel metering valve 46 coupled in flow series. Fuel supply system 26 may also include various other components (e.g., one or more boost pumps, pressure relief valves, pressurizing valves, filters, bypass valves, etc.) that are conventionally known and not shown in FIGS. 1-4 for clarity. Similarly, fuel divider system 24 may include various components (e.g., one or more flow divider valves, solenoid-actuated three way valves, check valves, pressurizing valves, etc.) that are well-known in the industry and not discussed herein in the interests of concision.

With continued reference to the exemplary embodiment illustrated in FIGS. 1-4, EV fuel return system 28 includes a housing assembly 50 having a first or primary manifold inlet 52, a second or secondary manifold inlet 54, and a fuel return outlet 56 formed therein. Primary manifold inlet 52 is fluidly coupled to flow passage 36, and therefore to primary manifold 32, via fuel divider system 24; and secondary manifold inlet 54 is fluidly coupled to flow passage 38, and therefore to secondary manifold 34, via fuel divider system 24. Fuel return outlet 56 is fluidly coupled to the inlet of fuel supply pump 44 via a flow passage 59; however, fuel return outlet 56 may be fluidly coupled to various other components of fuel supply system 26 (e.g., to an inlet of fuel tank 42) in alternative embodiments. Although illustrated as a unitary body in FIGS. 1-4, housing assembly 50 may include multiple individual housing components, which may or may not be rigidly joined together.

Figure 2:
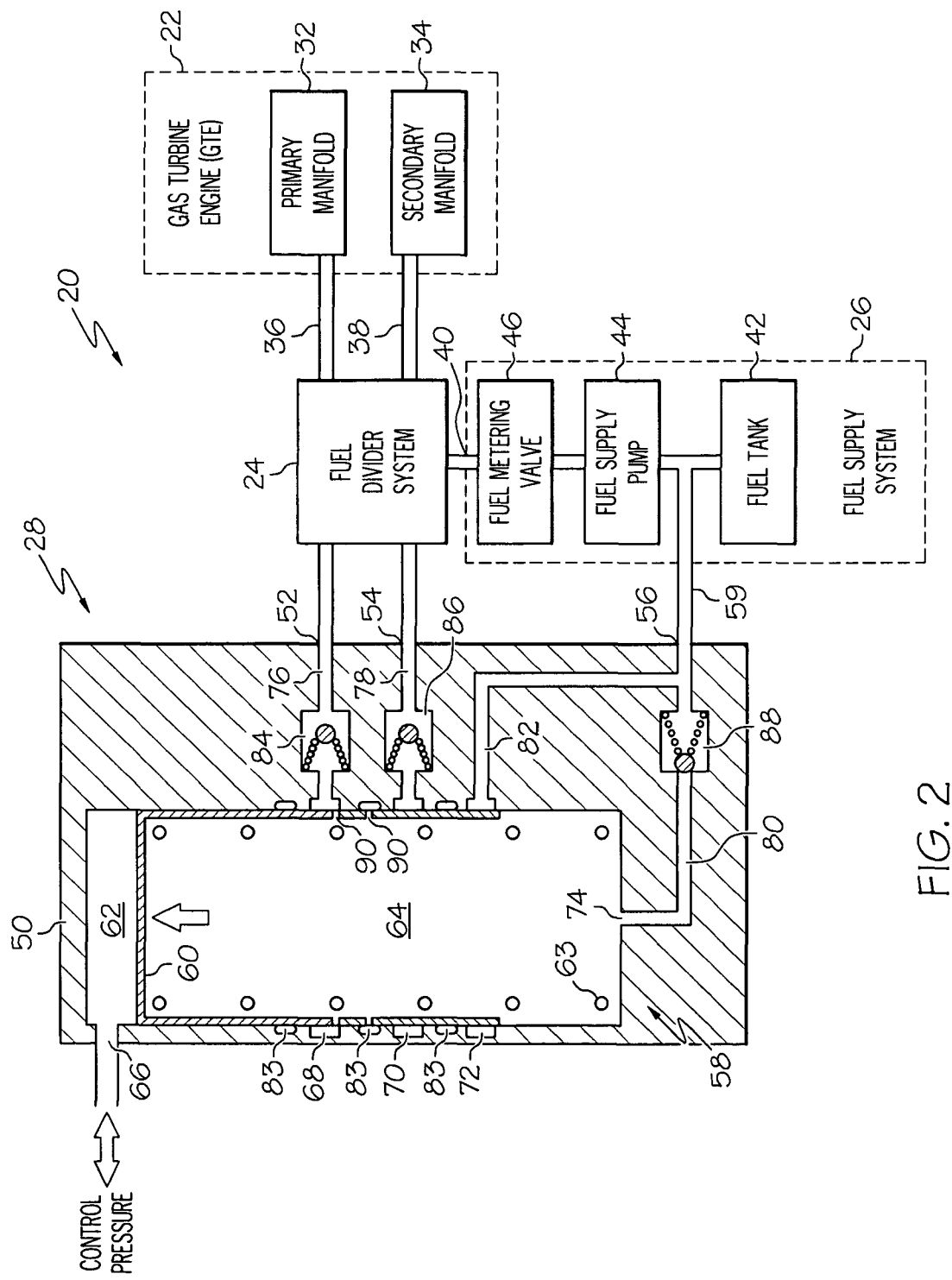
Figure 3:
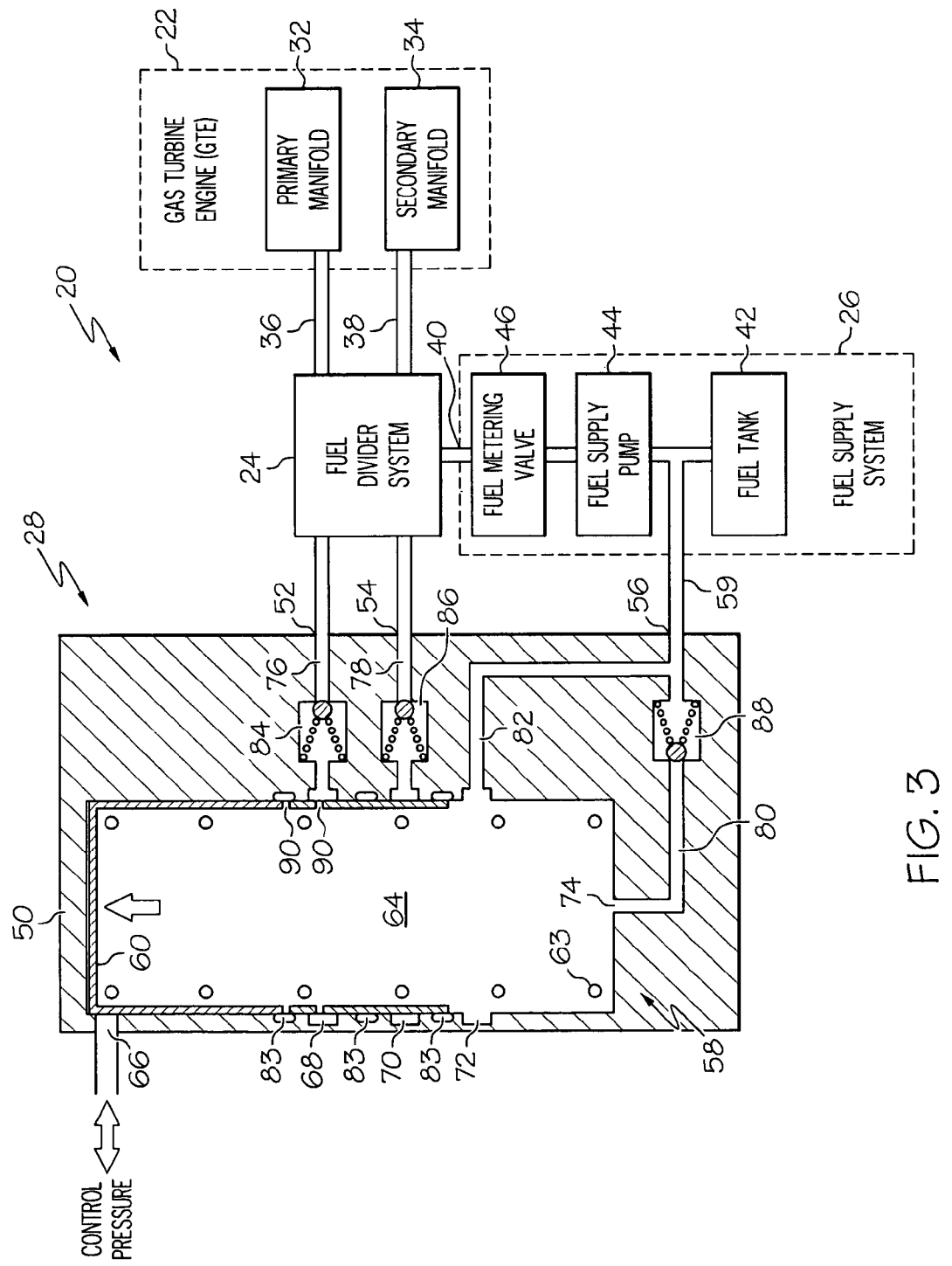
Figure 4:
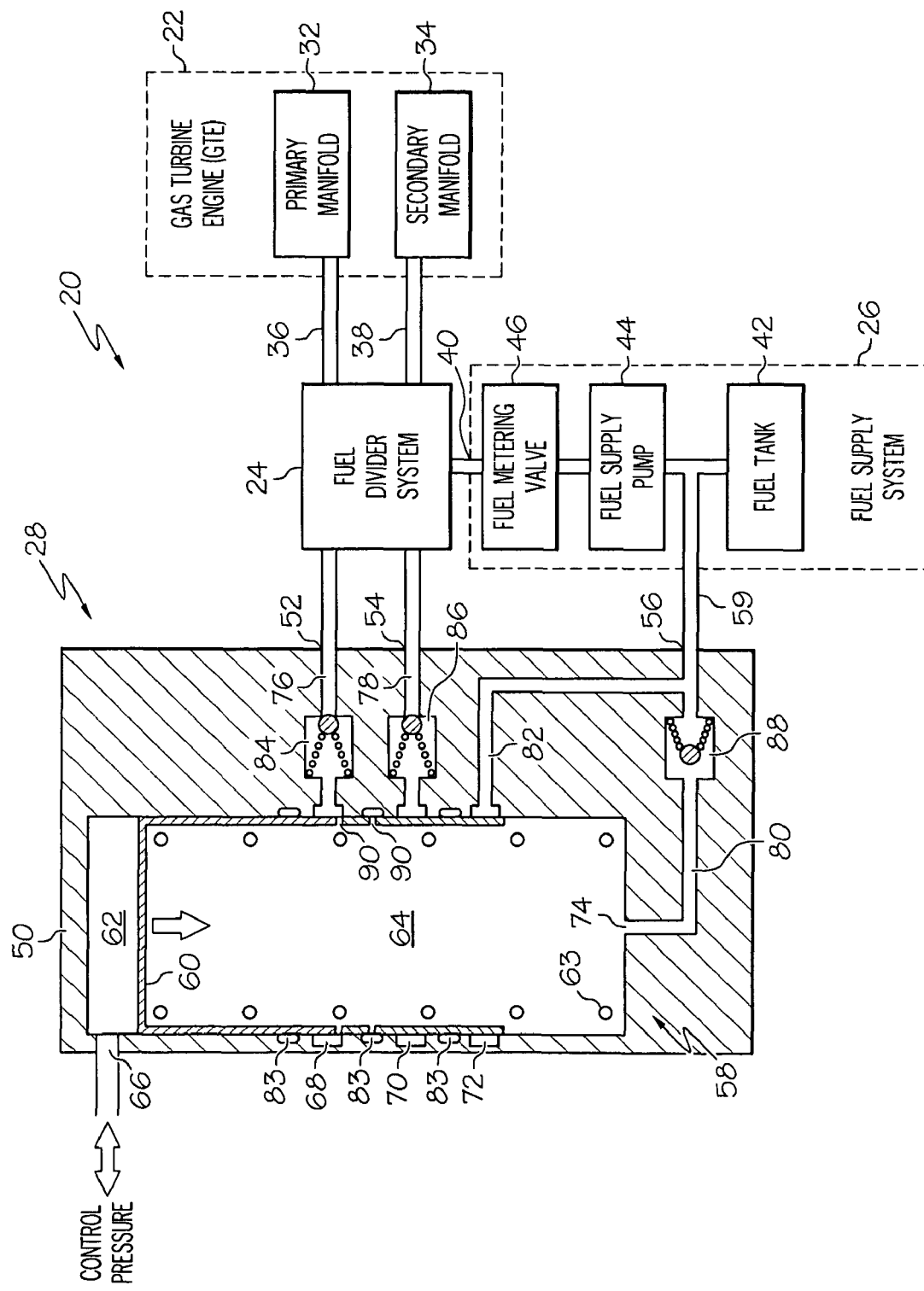

An ecology valve 58 is disposed within housing assembly 50. In the illustrated example, ecology valve 58 includes an accumulator piston 60 slidably mounted within housing assembly 50 for movement amongst a fuel return position (FIG. 1), a fuel storage position (FIG. 3), and various intermediate positions (FIGS. 2 and 4). Piston 60 cooperates with housing assembly 50 to define an ecology valve (EV) control chamber 62 and a fuel storage chamber 64 within housing assembly 50. A control port 66 is formed through housing assembly 50 to permit bi-directional fluid communication between EV control chamber 62 and a regulated pressure source; e.g., a pressure regulating valve, a pump flow sensing valve, or the like. A spring 63 is disposed within fuel storage chamber 64 and compressed between piston 60 and an inner wall of housing assembly 50. Spring 63 biases piston 60 toward the fuel storage position shown in FIG. 3.

In addition to control port 66, ecology valve 58 includes second, third, fourth, and fifth ports 68, 70, 72, and 74; however, in contrast to control port 66, control ports 68, 70, 72, and 74 are each fluidly coupled to fuel storage chamber 64. A plurality of conduits 76, 78, 80, 82 formed through housing assembly 50 fluidly couples the various ports of ecology valve 58 to primary manifold inlet 52, to secondary manifold inlet 54, and to fuel return outlet 56 of housing assembly 50. More specifically, first conduit 76 fluidly couples port 68 to primary manifold inlet 52; second conduit 78 fluidly couples port 70 to secondary manifold inlet 54; third conduit 80 fluidly couples port 74 to fuel return outlet 56; and fourth conduit 82 fluidly couples port 72 to conduit 80 and, therefore, to fuel return outlet 56. As indicated in FIGS. 1-4 at 83, a number of dynamic seals may be mounted between an inner surface of housing assembly 50 and an outer surface of piston 60 to minimize fuel leakage between EV control chamber 62, fuel storage chamber 64, and ports 68, 70, 72. Although ecology valve 58 is shown in two dimensional cross-section in FIGS. 1-4, it will be noted by the skilled practitioner that ports 68, 70, and 72 are each defined, at least in part, by a substantially annular bore formed in an inner surface of housing assembly 50.

Upon or immediately after shut-down of GTE 22, ecology valve 58 withdraws a predetermined volume of fuel from manifolds 32 and 34 and stores this fuel within fuel storage chamber 64. When operation of GTE 22 is again initiated, ecology valve 58 expels the previously-withdrawn fuel from fuel storage chamber 64. Certain known piston/reservoir ecology valve systems return the previously-withdrawn fuel directly to the GTE's fuel manifold or manifolds for combustion; however, this may disrupt the predetermined flow schedule and thereby comprise ideal engine lightoff conditions. In contrast, EV fuel return system 28 is configured to direct fuel previously-withdrawn from fuel manifolds 32 and 34 to a component of fuel supply system 26 upstream of fuel metering valve 46 and, preferably, to the inlet of fuel supply pump 44. To redirect fuel withdrawn from manifolds 32 and 34 to fuel supply system 26 in this manner, EV fuel return system 28 is further equipped with a fuel routing assembly configured to route fuel: (i) from manifold inlets 52 and 54, and thus from primary and secondary manifolds 32 and 34, to fuel storage chamber 64 of ecology valve 58 when GTE 22 is in a shut-down mode, and (ii) from fuel storage chamber 64 to fuel return outlet 56, and therefore to the inlet of fuel supply pump 44, when GTE 22 is in an engine start mode. The fuel routing assembly may assume any form suitable for selectively routing fuel withdrawn by ecology valve 58 in this manner. In the exemplary embodiment illustrated in FIGS. 1-4, the fuel routing assembly assumes the form of a plurality of check valves 84, 86, 88 fluidly coupled between primary manifold inlet 52, secondary manifold inlet 54, fuel return outlet 56, and fuel storage chamber 64 of ecology valve 58. In particular, first check valve 84 is fluidly coupled between port 68 of ecology valve 58 and primary manifold inlet 52 of housing assembly 50; second check valve 86 is fluidly coupled between port 70 of ecology valve 58 and secondary manifold inlet 54 of housing assembly 50; and, finally, third check valve 88 is fluidly coupled between port 74 of ecology valve 58 and fuel return outlet 56 of housing assembly 50. Check valves 84, 86, 88 each normally reside in a closed position and open under the conditions described below.

The operation EV fuel return system 28 will now be described in conjunction with FIGS. 1-4. Referring initially to FIG. 1, EV fuel return system 28 is illustrated when GTE 22 is in an operational or run mode. At this juncture, the fuel (or other such control fluid) directed through control port 66 and into EV control chamber 62 is at a relatively high pressure. The force exerted on piston 60 by the fuel within EV control chamber 62 is consequently sufficient to overcome the force exerted on piston 60 by spring 63 and any force exerted on piston 60 by the fuel within fuel storage chamber 64. Piston 60 has thus moved into the fuel return position shown in FIG. 1; and little to no fuel flows between fuel storage chamber 64 and primary manifold inlet 52, secondary manifold inlet 54, and fuel return outlet 56 of housing assembly 50.

FIG. 2 illustrates EV fuel return system 28 immediately after (e.g., a few seconds after) shut-down of GTE 22. Upon shut-down of GTE 22, or shortly thereafter, the control pressure supplied to EV control chamber 62 decreases to a predetermined minimum value; e.g., fuel tank pressure or fuel pump inlet pressure. The force exerted on piston 60 by the fuel within EV control chamber 62 thus decreases, spring 63 expands, and piston 60 moves toward the fuel storage position (FIG. 3). As piston 60 moves toward the fuel storage position (FIG. 3), one or more sidewall apertures formed through piston 60 align with ports 68 and 70; e.g., as indicated in FIG. 2, first and second apertures 90 may align with port 70 and subsequently with port 68 as piston 60 moves from the fuel return position (FIG. 1) toward the fuel storage position (FIG. 3). The movement of piston 60 and the alignment of apertures 90 with ports 70 and 68 causes check valves 86 and 84 to open, respectively. As check valve 86 opens, fuel flows from secondary manifold 34, through flow passage 38, through fuel divider system 24, into secondary manifold inlet 54, through check valve 86, and ultimately into fuel storage chamber 64. Similarly, as check valve 84 opens, fuel flows from primary manifold 32, through flow passage 36, through fuel divider system 24, into primary manifold inlet 52, through check valve 84, and ultimately into fuel storage chamber 64. When piston 60 has moved fully into the fuel storage position shown in FIG. 3 upon or shortly after shut-down of GTE 22, EV fuel return system 28 has thus removed a predetermined volume of fuel from primary manifold 32 and secondary manifold 34.

It will be noted that, as piston 60 transitions from the fuel return position (FIG. 1) to the fuel storage position (FIG. 3), check valve 88 remains closed. It will also be noted that, when piston 60 resides in the fuel return position (FIG. 1), one or more of apertures 90 align with port 72 of ecology valve 58. When piston 60 is in the fuel return position (FIG. 1) and check valve 88 is in a closed position, fluid communication is still permitted between fuel storage chamber 64 and fuel supply system 26 via conduit 82 and flow passage 59. The provision of a conduit that bypasses check valve 88, such as conduit 82, prevents a hydraulic lock from a developing and impeding the movement of piston 60 when transitioning from the fuel return position (FIG. 1) to the fuel storage position (FIG. 3).

FIG. 4 illustrates EV fuel return system 28 during startup of GTE 22. The control pressure supplied to EV control chamber 62 has again increased to a level sufficient to overcome the spring bias force exerted on piston 60 by spring 63. Piston 60 consequently transitions from the fuel storage position (FIG. 3) toward the fuel return position (FIG. 1). As piston 60 undergoes this transition, fuel previously withdrawn from primary manifold 32 and secondary manifold 34 is expelled from fuel storage chamber 64 through port 74. This causes check valve 88 to open. The fuel then flows through check valve 88, exits EV fuel return system 28 through fuel return outlet 56, and is ultimately directed to the inlet of fuel supply pump 44. In this manner, EV fuel return system 28 returns fuel previously-withdrawn from manifolds 32 and 34 to a location upstream of the outlet of fuel metering valve 46 and, in so doing, prevents the returned fuel from disrupting any predetermined flow schedule that may exist.

It should thus be appreciated that there has been provided an exemplary embodiment of an ecology valve fuel return system that avoids disruption of a predetermined flow schedule when returning fuel withdrawn from one or more fuel manifolds. While described above in conjunction with a GTE employing two manifolds, embodiments of the EV fuel return system may also be utilized in conjunction with a single manifold GTE or with a GTE employing three or more manifolds. In addition, embodiments of the EV fuel return system may be utilized in conjunction with a GTE employing two or more sets of nozzles (e.g., a first set of air blast nozzles and a second set of atomizer nozzles). Furthermore, alternative embodiments of the EV fuel return system may employ two or more ecology valves; e.g., certain embodiments of the EV fuel return system may include a first ecology valve that is fluidly coupled to and withdraws fuel from a primary GTE manifold, as well as a second ecology valve that is fluidly coupled to and withdraws fuel from a secondary GTE manifold. Furthermore, although assuming the form of a plurality of check valves in the foregoing embodiment, the fuel routing assembly may assume any form suitable for selectively routing fuel withdrawn from one or more fuel manifolds in the above-described manner. To further emphasize this point, an exemplary embodiment of an ecology valve fuel return system wherein the fuel routing assembly comprises a transfer valve will now be described in conjunction with FIGS. 5 and 6.

Figure 5:
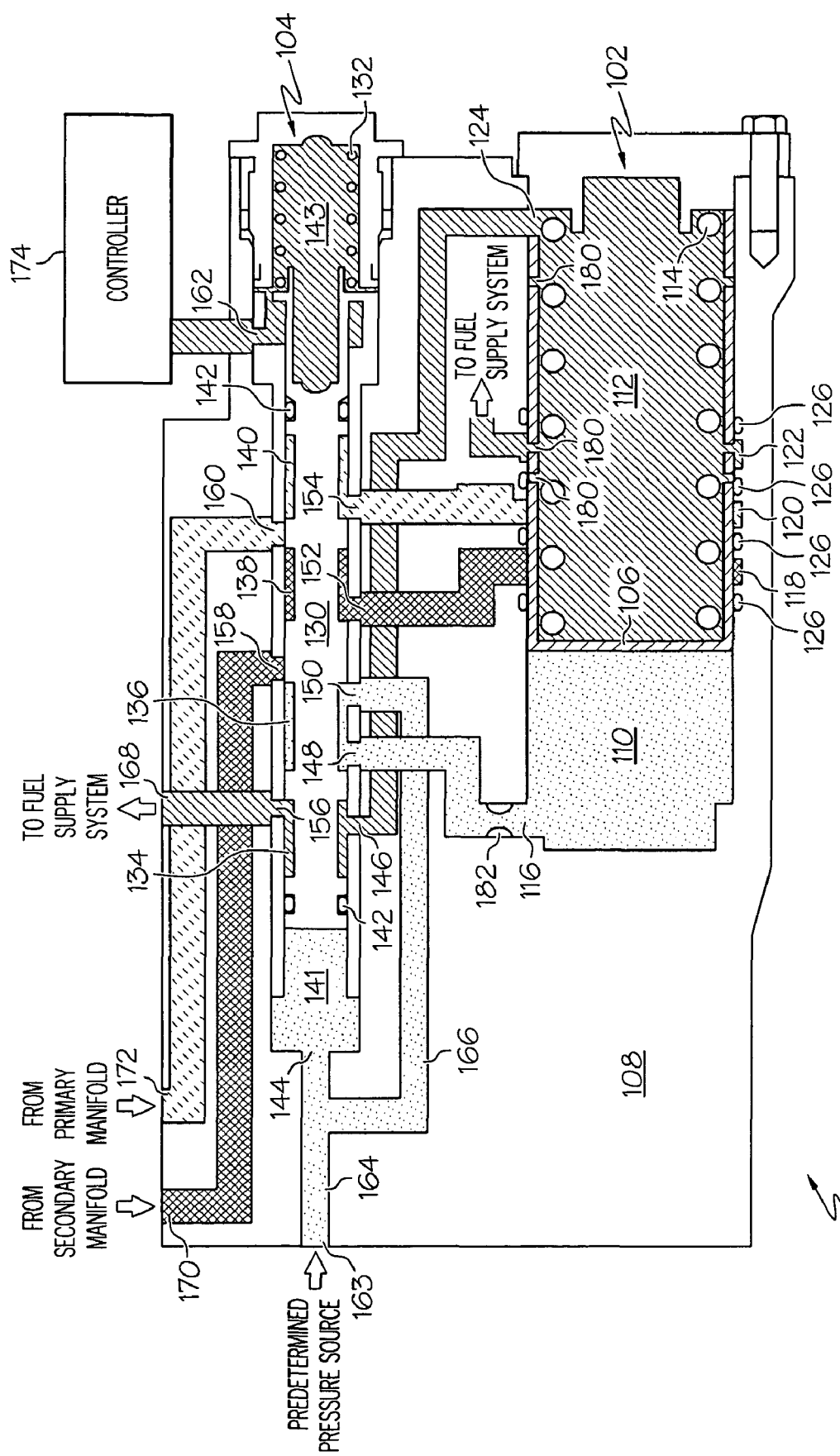
FIGS. 5 and 6 are simplified schematics of an ecology valve fuel return system in engine run and engine shut-down modes, respectively, in accordance with a second exemplary embodiment.
Figure 6:
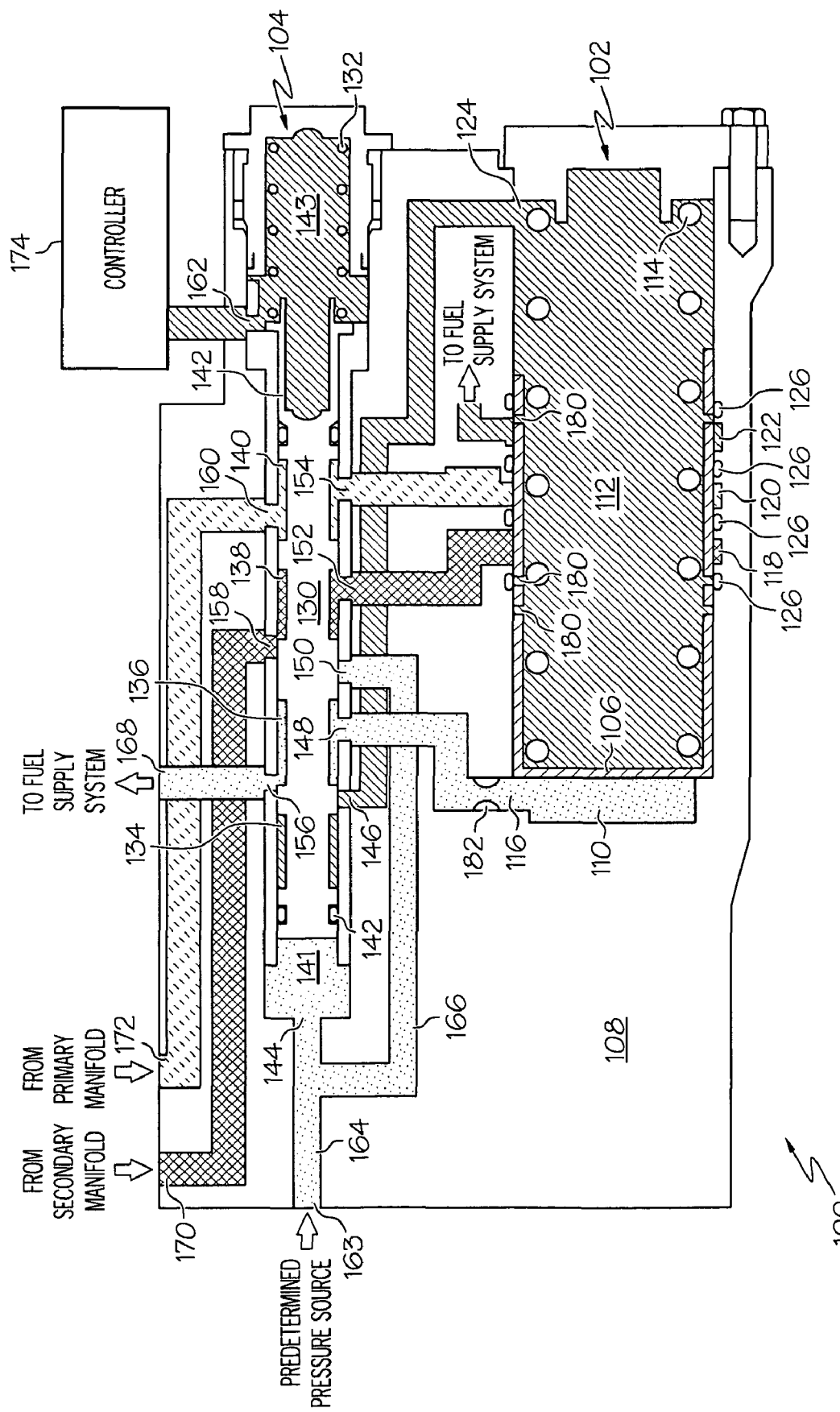

FIGS. 5 and 6 are simplified schematics of an ecology valve (EV) fuel return system 100 in engine run and engine shut-down modes, respectively, in accordance with a second exemplary embodiment. EV fuel return system 100 may be utilized in conjunction with a dual-manifold gas turbine engine, such as GTE 22 shown in FIGS. 1-4 and discussed above. EV fuel return system 100 includes two primary components, namely, an ecology valve 102 and a fuel routing assembly 104. In many respects, ecology valve 102 is similar to ecology valve 58 described above in conjunction with FIGS. 1-4. For example, ecology valve 102 includes a piston 106 slidably mounted within a housing assembly 108 for translational movement between a fuel return position (FIG. 5) and a fuel storage position (FIG. 6). Piston 106 cooperates with housing assembly 108 to define an EV control chamber 110 and a fuel storage chamber 112. A spring 114 is disposed within fuel storage chamber 112 and biases piston 106 toward the fuel storage position (FIG. 6). Ecology valve 102 further includes a first port 116 fluidly coupled to EV control chamber 110 and second, third, fourth, and fifth ports 118, 120, 122, and 124 each fluidly coupled to fuel storage chamber 112. As indicated in FIGS. 5 and 6, ports 118, 120, and 122 may each have a substantially annular geometry. As was the case previously, a plurality of dynamic seals 126 may be disposed between an inner surface of housing assembly 108 and an outer surface of piston 106 to minimize fuel leakage between the various ports of ecology valve 102, EV control chamber 110, and fuel storage chamber 112. Although illustrated as a unitary body in FIGS. 5 and 6, housing assembly 108 may include multiple individual housing components, which may or may not be rigidly joined together.

In the illustrated exemplary embodiment shown in FIGS. 5 and 6, fuel routing assembly 104 assumes the form of a transfer valve including a transfer piston 130. Transfer piston 130 is slidably mounted within housing assembly 108 for movement between a first translational position (FIG. 5) and a second translational position (FIG. 6). A spring 132 is compressed between an end portion of transfer piston 130 and an inner wall of housing assembly 108 and biases transfer piston 130 toward the second translational position (FIG. 6). Transfer piston 130 is formed (e.g., machined) to include a first annulus 134, a second annulus 136, a third annulus 138, and a fourth annulus 140. As transfer piston 130 translates within housing assembly 108, annuli 134, 136, 138, and 140 fluidly couple different ports of fuel routing assembly 104 as described more fully below. To deter fuel leakage, one or more dynamic seals may be mounted around each end of transfer piston 130 as generally shown in FIGS. 5 and 6 at 142. Piston 130 further cooperates with housing assembly 108 to define a reference pressure chamber 141 and a routing assembly (RA) control chamber 143 within housing assembly 108. As will be described more fully below, the fuel within reference pressure chamber 141 and that within RA control chamber 143 act antagonistically on first and second exposed areas of piston 130 to determine the translational position thereof Fuel routing assembly 104 further includes ten ports 144, 146, 148, 150, 152, 154, 156, 158, 160, and 162. Port 144 is fluidly coupled between reference pressure chamber 141 and a conduit 164 formed within housing assembly 108. Conduit 164 is fluidly coupled to a predetermined pressure source, such as a fuel control unit regulated supply pressure, via a control pressure port 163 of housing assembly 108. Ports 146, 148, 152, and 154 of fuel routing assembly 104 are fluidly coupled to ports 124, 116, 118, and 120 of ecology valve 102, respectively. Port 150 of fuel routing assembly 104 is fluidly coupled to conduit 164, and therefore to the predetermined pressure source, via a conduit 166. Port 156 is fluidly coupled to a fuel return outlet 168 of housing assembly 108, which is, in turn, fluidly coupled to a component of a non-illustrated fuel supply system and, preferably, to the inlet of a fuel supply pump included within a fuel supply system; e.g., to the inlet of fuel supply pump 44 of fuel supply system 26 (FIGS. 1-4). Port 158 of fuel routing assembly 104 is fluidly coupled to a secondary manifold inlet 170 of housing assembly 108, which may be fluidly coupled to a secondary GTE fuel manifold through a fuel divider system; e.g., secondary manifold 34 of GTE 22 through fuel divider system 24 as shown in FIGS. 1-4. Port 160 is fluidly coupled to a primary manifold inlet 172 of housing assembly 108, which may be fluidly coupled to a primary GTE fuel manifold through a fuel divider system; e.g., primary manifold 32 of GTE 22 through fuel divider system 24 (FIGS. 1-4). Finally, port 162 fluidly couples RA control chamber 143 to a hydraulic controller 174, which may selectively vary the fuel pressure within control chamber 143 to control the translational position of transfer piston 130 as described below.

The operation of EV fuel routing system 100 will now be described in conjunction with FIGS. 5 and 6. Referring initially to FIG. 5, EV fuel routing system 100 is illustrated during an engine run mode. At this juncture, controller 174 supplies a predetermined low pressure to RA control chamber 143. At the same time, the predetermined pressure source supplies pressurized fuel to reference pressure chamber 141 at a predetermined intermediate pressure. The force exerted on piston 130 by the fuel within reference pressure chamber 141 thus exceeds the cumulative force exerted on piston 130 by spring 132 and the fuel within RA control chamber 143, and transfer piston 130 remains in the first translational position shown in FIG. 5.

When transfer piston 130 resides in the first translational position (FIG. 5), annulus 136 fluidly couples ports 150 and 148 of fuel routing assembly 104. As a result, pressurized fuel received from the predetermined pressure source is permitted to flow through conduits 164 and 166, into port 150 of fuel routing assembly 104, through annulus 136, through port 148, and ultimately into EV control chamber 110 of ecology valve 102. The pressurized fuel within EV control chamber 110 exerts a force on piston 106 that exceeds the cumulative force exerted on piston 106 by spring 114 and the fuel within fuel storage chamber 112. Consequently, when transfer piston 130 resides the first translational position, accumulator piston 106 of ecology valve 102 remains in the fuel return position shown in FIG. 5.

FIG. 6 illustrates EV fuel routing system 100 after engine shut-down. Controller 174 now supplies a predetermined high pressure to RA control chamber 143. The fuel within RA control chamber 143 exerts a force on transfer piston 130 that, in combination with the spring force exerted on piston 130 by spring 132, is sufficient to overcome the force exerted on piston 130 by the fuel within reference pressure chamber 141. Transfer piston 130 of fuel routing assembly 104 has consequently moved into the second translational position (FIG. 6). Notably, in this position, transfer piston 130 blocks fluid communication between the predetermined pressure source and EV control chamber 110. At the same time, annulus 136 fluidly couples ports 148 and 156 of fuel routing assembly 104. Accordingly, the fuel pressure within EV control chamber 110 has decreased, and spring 114 has expanded to maintain piston 106 in the fuel storage position shown in FIG. 6.

In the second translational position shown in FIG. 6, annulus 138 permits fluid communication between ports 152 and 158 of fuel routing assembly 104, and annulus 140 permits fluid communication between ports 154 and 160. As piston 106 moves from the fuel return position (FIG. 5) toward the fuel storage position (FIG. 6), sidewall ports 180 formed through piston 106 align with ports 118 and 120 to permit fuel to flow from primary manifold inlet 170 and secondary manifold inlet 172 and into fuel storage chamber 112. Consequently, as piston 106 moves from the fuel return position (FIG. 5) toward the fuel storage position (FIG. 6), EV fuel return system 100 withdraws a predetermined volume of fuel from the GTE manifolds fluidly coupled to manifold inlets 170 and 172.

When engine operation is reinitiated, controller 174 again supplies the predetermined low pressure to RA control chamber 143 and transfer piston 130 returns to the first translational position (FIG. 5). As previously stated, in the first translational position, annulus 136 fluidly couples ports 148 and 150 and thereby fluidly couples EV control chamber 110 to the predetermined pressure source. The fuel pressure within EV control chamber 110 consequently increases to a level sufficient to overcome the spring bias force of spring 114 and move piston 106 from the fuel storage position (FIG. 6) into the fuel return position (FIG. 5). As piston 106 moves from the fuel storage position (FIG. 6) into the fuel return position (FIG. 5), the previously withdrawn fuel contained within fuel storage chamber 112 is expelled through port 124. When piston 130 of fuel routing assembly 104 is in the first translational position (FIG. 5) annulus 134 fluidly couples ports 146 and 156, which permits the fuel received at port 124 to flow through fuel return outlet 168 and to a component of the fuel supply system downstream thereof (e.g., to the inlet of a fuel supply pump). In this manner, EV fuel return system 100 returns fuel withdrawn from one or more engine manifolds to the fuel supply system without disrupting any predetermined flow schedule that may exist. As indicated in FIGS. 5 and 6, port 122 remains open to the fuel supply system irregardless of the translational position of transfer piston 130. As does port 72 and bypass conduit 82 of EV fuel return assembly 28

(FIGS. 1-4), port 122 provides a flow path that bypasses fuel routing assembly 104 to prevent hydraulic lock when piston 106 transitions from fuel return position (FIG. 5) to the fuel storage position (FIG. 6). To help ensure that piston 106 moves in smooth and controlled manner, a rate limit bleed may be disposed downstream of control chamber 110 as generally shown in FIG. 6 at 182.

It should thus be appreciated that a second exemplary embodiment has been provided of an ecology valve fuel return system that avoids disruption of a predetermined flow schedule when returning fuel withdrawn from one or more engine manifolds by an ecology valve. In the above-described exemplary embodiment, the fuel routing assembly assumed the form of a transfer valve including a hydraulically-actuated transfer piston; however, in alternative embodiments, the transfer piston may be configured to be actuated utilizing a pneumatic or electronic means, such as a solenoid.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims. Certain numerical identifiers, such as "first," "second," "third," etc., have been utilized in the foregoing Detailed Description as a convenient means for referring to the order in which similar components (e.g., check valves) were introduced. In the subsequent Claims, such numerical identifiers may be changed as appropriate to reflect a different order of introduction.

What is claimed is:

1. An ecology valve (EV) fuel return system utilized in conjunction with fuel supply system and a gas turbine engine (GTE) including at least a first fuel manifold, the EV fuel return system comprising:
   a housing assembly having a fuel return outlet and a first manifold inlet fluidly coupled to the fuel supply system and to the first fuel manifold, respectively;
   an ecology valve disposed in the housing assembly and fluidly coupled between the fuel return outlet and the first manifold inlet; and
   a fuel routing assembly fluidly coupled between the fuel return outlet, the first manifold inlet, and the ecology valve, the fuel routing assembly routing fuel: (i) from the first manifold inlet to the ecology valve when the GTE is in a shut-down mode, and (ii) from the ecology valve, through the fuel return outlet, and to the fuel supply system to return the fuel withdrawn from the first fuel manifold to the fuel supply system when the GTE is in an engine start mode.

2. An EV fuel return system according to claim 1 wherein the ecology valve comprises:
   a piston slidably disposed in the housing assembly and movable between a fuel storage position and a fuel return position; and
   a fuel storage chamber generally defined by the housing assembly and the piston, the fuel storage chamber fluidly coupled to the fuel return outlet and to the first manifold inlet through the fuel routing assembly.

3. An EV fuel return system according to claim 2 wherein the ecology valve further comprises an EV control chamber generally defined by the housing assembly and the piston, the fluid within the EV control chamber acting on the piston in opposition to the fuel within the fuel storage chamber.

4. An EV fuel return system according to claim 2 wherein the fuel routing assembly is further configured to route fuel: (i) from the first manifold inlet to the fuel storage chamber when the piston transitions from the fuel return position to the fuel storage position, and (ii) from the fuel storage chamber to the fuel return outlet when the piston transitions from the fuel storage position to the fuel return position.

5. An EV fuel return system according to claim 2 wherein the fuel routing assembly comprises:
   a first check valve fluidly coupled between the fuel storage chamber and the fuel return outlet; and
   a second check valve fluidly coupled between the fuel storage chamber and the first manifold inlet.

6. An EV fuel return system according to claim 5 wherein the first check valve normally resides in a closed position and is configured to open when the piston transitions from the fuel storage position to the fuel return position.

7. An EV fuel return system according to claim 6 wherein the second check valve normally resides in a closed position and is configured to open when the piston transitions from the fuel return position to the fuel storage position.

8. An EV fuel return system according to claim 5 wherein the GTE further includes a second fuel manifold, wherein the housing assembly further includes a second manifold inlet configured to be fluidly coupled to the second fuel manifold, and wherein the fuel routing assembly further comprises a third check valve fluidly coupled between the ecology valve and the second manifold inlet.

9. An EV fuel return system according to claim 8 wherein the third check valve normally resides in a closed position and is configured to open when the piston transitions from the fuel return position to the fuel storage position.

10. An EV fuel return system according to claim 2 further comprising a bypass conduit fluidly coupled between the fuel return outlet and the fuel storage chamber, the bypass conduit permitting fluid communication between the fuel return outlet and the fuel storage chamber when the piston transitions from the fuel return position to the fuel storage position to prevent hydraulic lock.

11. An EV fuel return system according to claim 3 wherein the fuel routing assembly comprises a transfer valve fluidly coupled between the ecology valve, the fuel return outlet, and the first manifold inlet.

12. An EV fuel return system according to claim 11 wherein the transfer valve comprises a transfer piston slidably mounted within the housing assembly for movement between first and second translational positions, and wherein EV fuel return system is further utilized in conjunction with a predetermined pressure source supplying fuel at a predetermined pressure and acting on an exposed area of the transfer piston.

13. An EV fuel return system according to claim 12 wherein the transfer piston is configured to: (i) route the fuel supplied by the predetermined pressure source into the EV control chamber when in the first translational position, and (ii) route fuel from the EV control chamber to fuel return outlet in the second translational position.

14. An EV fuel return system according to claim 3 wherein the EV fuel return system is further utilized in conjunction with a regulated pressure source configured to supply a control fluid to the EV control chamber at a lower pressure when the GTE is in the shut-down mode and at a higher pressure when the GTE is in the engine start mode, and wherein the ecology valve is configured such that the piston moves into:

(i) the fuel storage position when the regulated pressure source supplies the lower pressure to the EV control chamber, and (ii) the fuel return position when the regulated pressure source supplies the higher pressure to the EV control chamber.

15. An ecology valve (EV) fuel return system utilized in conjunction with fuel supply system and a gas turbine engine (GTE) including at least a first fuel manifold, the EV fuel return system comprising:
   a housing assembly having a fuel return outlet and a first manifold inlet fluidly coupled to the fuel supply system and to the first fuel manifold, respectively;
   an ecology valve, comprising:
      a piston slidably disposed in the housing assembly and movable between a fuel storage position and a fuel return position; and
      a fuel storage chamber generally defined by the housing assembly and the piston, the fuel storage chamber fluidly coupled to the fuel return outlet and to the first manifold inlet; and
   a fuel routing assembly fluidly coupled between the fuel return outlet, the first manifold inlet, and the fuel storage chamber, the fuel routing assembly routing fuel: (i) from the first manifold inlet to the fuel storage chamber when the piston transitions from the fuel return position to the fuel storage position, and (ii) from the fuel storage chamber, through the fuel return outlet, and to the fuel supply system to return the fuel withdrawn from the first fuel manifold to the fuel supply system when the piston transitions from the fuel storage position to the fuel return position.

16. An EV fuel return system according to claim 15 wherein the fuel routing assembly comprises at least one component selected from the group consisting of a transfer piston and a check valve.

17. A fuel control assembly for use in conjunction with a gas turbine engine (GTE) including at least a first fuel manifold, the fuel control assembly comprising:
   a fuel supply system configured to be fluidly coupled to the first fuel manifold and to supply metered fuel thereto; and
   an ecology valve (EV) fuel return system, comprising:
      a housing assembly having a fuel return outlet fluidly coupled to the fuel supply system and having a fuel return inlet configured to be fluidly coupled to the first fuel manifold;
      an ecology valve disposed in the housing assembly and fluidly coupled between the fuel return outlet and the first manifold inlet; and
      a fuel routing assembly fluidly coupled between the fuel return outlet, the first manifold inlet, and the ecology valve, the fuel routing assembly configured to route fuel: (i) from the first manifold inlet to the ecology valve to withdraw fuel from the first fuel manifold when the GTE is in a shut-down mode, and (ii) from the ecology valve to the fuel return outlet to return fuel to the fuel supply system when the GTE is in an engine start mode.

18. A fuel control assembly according to claim 17 wherein the ecology valve further comprises an EV control chamber generally defined by the housing assembly and the piston, the fluid within the EV control chamber acting on the piston in opposition to the fuel within the fuel storage chamber.

19. A fuel control assembly according to claim 18 wherein the fuel routing assembly is further configured to route fuel: (i) from the first manifold inlet to the fuel storage chamber when the piston transitions from the fuel return position to the fuel storage position, and (ii) from the fuel storage chamber, through the fuel return outlet, and to the fuel supply system when the piston transitions from the fuel storage position to the fuel return position.

20. A fuel control assembly according to claim 19 wherein the fuel supply system comprises a fuel metering valve, and wherein the ecology valve is configured to return fuel to the fuel supply system upstream of the fuel metering valve when the piston transitions from the fuel storage position to the fuel return position.

\* \* \* \* \*